United States Patent
Frosio et al.

(10) Patent No.: US 9,501,837 B2
(45) Date of Patent: Nov. 22, 2016

(54) METHOD AND SYSTEM FOR UNSUPERVISED IMAGE SEGMENTATION USING A TRAINED QUALITY METRIC

(71) Applicant: Lyrical Labs Video Compression Technology, LLC, New York, NY (US)

(72) Inventors: Iuri Frosio, Cupertino, CA (US); Edward Ratner, Iowa City, IA (US)

(73) Assignee: Lyrical Labs Video Compression Technology, LLC, New York, NY (US)

( * ) Notice: Subject to any disclaimer, the term of this patent is extended or adjusted under 35 U.S.C. 154(b) by 0 days.

(21) Appl. No.: 14/696,255

(22) Filed: Apr. 24, 2015

(65) Prior Publication Data

US 2016/0098842 A1   Apr. 7, 2016

Related U.S. Application Data

(60) Provisional application No. 62/058,647, filed on Oct. 1, 2014, provisional application No. 62/132,167, filed on Mar. 12, 2015.

(51) Int. Cl.
*G06K 9/00* (2006.01)
*G06T 7/00* (2006.01)

(52) U.S. Cl.
CPC ............ *G06T 7/0083* (2013.01); *G06T 7/0081* (2013.01); *G06T 7/0085* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 6,625,308 B1 * | 9/2003 | Acharya | G06K 9/38 382/164 |
| 9,280,831 B1 * | 3/2016 | Harary | G06T 7/0085 |
| 9,317,927 B2 * | 4/2016 | Hamarneh | G06T 7/0097 |
| 2008/0123959 A1 * | 5/2008 | Ratner | G06K 9/46 382/173 |
| 2009/0148041 A1 * | 6/2009 | Piramuthu | G06T 7/0081 382/173 |
| 2010/0081931 A1 * | 4/2010 | Destrempes | G06T 7/0083 600/437 |
| 2010/0322489 A1 * | 12/2010 | Tizhoosh | G06K 9/6253 382/128 |
| 2013/0279591 A1 * | 10/2013 | Ratner | H04N 19/00733 375/240.16 |
| 2014/0198979 A1 * | 7/2014 | Hamarneh | A61B 6/03 382/154 |
| 2015/0071541 A1 * | 3/2015 | Qutub | G06T 7/0081 382/173 |
| 2016/0065959 A1 * | 3/2016 | Stobaugh | H04N 19/176 375/240.26 |
| 2016/0098842 A1 * | 4/2016 | Frosio | G06T 7/0083 382/199 |

OTHER PUBLICATIONS

Felzenszwalb et al., "Efficient Graph-Based Image Segmentation", International Journal of Computer Vision (2004).*

(Continued)

(Continued)

Frosio et al. "Adaptive Segmentation Based on a Learned Quality

*Primary Examiner* — Aaron W Carter
(74) *Attorney, Agent, or Firm* — Faegre Baker Daniels LLP

(57) ABSTRACT

A method and apparatus for unsupervised segmentation of an image is provided. In some exemplary embodiments, the method adjusts a segmentation parameter of a traditional graph-based segmentation algorithm along the image to generate a segmentation map that is perceptually reasonable for a human observer. In some embodiments, the method reduces over-segmentation and under-segmentation of the image.

5 Claims, 15 Drawing Sheets
(10 of 15 Drawing Sheet(s) Filed in Color)

(56) References Cited

OTHER PUBLICATIONS

Iannizzotto et al., "Fast and Accurate Edge-Based Segmentation with No Contour Smoothing in 2-D Real Images", IEEE (2000).*
Candemir et al. "Multi-Class Regularization Parameter Learning for Graph Cut Image Segmentation". 2013 IEEE 10th International Symposium on Biomedical Imaging, pp. 1473-1476, Jan. 2013.
Metric". Proceedings of the 10th International Conference on Computer Vision Theory and Applications. pp. 283-292. Mar. 11, 2015.
Peng et al. "Parameter Selection For Graph Cut Based Image Segmentation". Proceedings of the British Machine Vision Conference 2008, pp. 16.1-16.10, Sep. 1, 2008.
Witten et al. "Data Mining: Practical Machine Learning Tools and Techniques". Page 310. 2011.
International Application No. PCT/US2015/053355. Notification of Transmittal of the International Search Report and the Written Opinion of The International Searching Authority, or the Declaration. International Filing Date: Sep. 30, 2015. Mail Date: Feb. 3, 2016. 13 pages.

* cited by examiner

METHOD AND SYSTEM FOR UNSUPERVISED IMAGE SEGMENTATION USING A TRAINED QUALITY METRIC

CROSS-REFERENCE TO RELATED APPLICATION

This application claims priority to Provisional Applications No. 62/058,647, filed on Oct. 1, 2014; and 62/132,167, filed on Mar. 12, 2015, the entirety of each of which is hereby incorporated by reference for all purposes.

FIELD OF THE INVENTION

The present invention relates to the processing of image data and in particular to segmentation of images, as well as 3-dimensional or higher-dimensional data.

BACKGROUND

Segmentation is a key processing step in many applications, ranging for instance from medical imaging to machine vision and video compression technology. Although different approaches to segmentation have been proposed, those based on graphs have attracted lot of researchers because of their computational efficiency.

Many segmentation algorithms are known to the practitioners in the field, today. Some examples include the watershed algorithm, and SLIC, a superpixel algorithm based on nearest neighbor aggregation. Typically, these algorithms have a common disadvantage in that they require a scale parameter to be set by a human supervisor. Thus, the practical applications have, in general, involved supervised segmentation. This may limit the range of applications, since in many instances segmentation is to be generated dynamically and there may be no time or opportunity for human supervision.

In embodiments, a graph-based segmentation algorithm based on the work of P. F. Felzenszwalb and D. P. Huttenlocher is used. They discussed basic principles of segmentation in general and applied these principles to develop an efficient segmentation algorithm based on graph cutting in their paper "Efficient Graph-Based Image Segmentation," Int. Jour. Comp. Vis., 59(2), September 2004, herein incorporated by reference in its entirety. Felzenszwalb and Huttenlocher stated that any segmentation algorithm should "capture perceptually important groupings or regions, which often reflect global aspects of the image."

Based on the principle of a graph-based approach to segmentation, Felzenszwalk and Huttenlocher first build an undirected graph G=(V, E) where $v_i \in V$ is the set of pixels of the image that has to be segmented and $(v_i, v_j) \in E$ is the set of edges that connects pairs of neighboring pixels; a non-negative weight $w(v_i, v_j)$ is associated to each edge with a magnitude proportional to the difference between $v_i$ and $v_j$. Image segmentation is identified by finding a partition of V such that each component is connected, the internal difference between the elements of each component is minimal whereas the difference between elements of different components is maximal. This is achieved by the definition of a predicate in Equation (1) that determines if a boundary exists between two adjacent components $C_1$ and $C_2$, that is:

$$D(C_1, C_2) = \begin{cases} \text{true} & \text{if } Dif(C_1, C_2) > MInt(C_1, C_2) \\ \text{false} & \text{otherwise} \end{cases} \quad (1)$$

where $Dif(C_1, C_2)$ is the difference between the two components, defined as the minimum weight of the set of edges that connects $C_1$ and $C_2$; $MInt(C_1, C_2)$ is the minimum internal difference, defined in Equation (2) as:

$$MInt(C_1, C_2) = \min[Int(C_1) + \tau(C_1), Int(C_2) + \tau(C_2)] \quad (2)$$

where Int(C) is the largest weight in the minimum spanning tree of the component C and describes therefore the internal difference between the elements of C; and where $\tau(C)=k/|C|$ is a threshold function used to establish whether there is evidence for a boundary between two components. The threshold function forces two small segments not to fuse at least there if is a strong evidence of difference between them.

In practice, the segment parameter k sets the scale of observation. Although Felzenszwalb and Huttenlocher demonstrate that the algorithm generates a segmentation map that is neither too fine nor too coarse, but the definition of fineness and coarseness finally depends on k that has to be carefully set by the user to obtain a perceptually reasonable segmentation.

The definition of the proper value of k for the graph-based algorithm, as well as the choice of the threshold value used for edge extraction in other edge-based segmentation algorithms such as, for example, the algorithms described by Iannizzotto and Vita in "Fast and Accurate Edge-Based Segmentation with No Contour Smoothing in 2-D Real Images," Giancarlo Iannizzotto and Lorenzo Vita, IEEE Transactions on Image Processing, Vol. 9, No. 7, pp. 1232-1237 (July 2000), the entirety of which is hereby incorporated by reference herein for all purposes, remains up to now an open issue when "perceptually important groupings or regions" have to be extracted from the image. In the algorithm described by Iannizzotto and Vita, edges are detected by looking at gray-scale gradient maxima with gradient magnitudes above a threshold value. For this algorithm, k is this threshold value and needs to be set appropriately for proper segmentation. In embodiments, segmentation based on edge-extraction may be used. In those embodiments, edge thresholds are established based on a strength parameter k. In the field of segmentation algorithms, in general, a parameter is used to set the scale of observation. In cases in which segmentation is performed in a supervised mode, a human user selects the k value for a particular image. It is however clear that the segmentation quality provided by a certain algorithm is generally related to the quality perceived by a human observer, especially for applications (like video compression) where a human being does constitute the final beneficiary of the output of the algorithm.

For example, a 640×480 color image is provided in FIG. 1A. A graph cut algorithm was used to generate the segmentation results associated with the image of FIG. 1A as discussed herein. Segmentation maps with σ=0.5, and a min size of 5 of the image of FIG. 1A are provided in FIGS. 1B-1D for various values of k. In FIG. 1B, k is 3, in FIG. 1C, k is 100, and in FIG. 1D, k is 10,000. As illustrated in FIG. 1B, values of k too small may lead to over-segmentation. As illustrated in FIG. 1D, large values of k may introduce under-segmentation.

SUMMARY

Embodiments of the presently disclosed methods can be used to perform segmentation with no supervision, using an algorithm that automatically adapts a segment parameter along the image to generate a segmentation map that is perceptually reasonable for a human observer. Embodiments include training a segmentation quality model with a set of training images, classifying the images as over-segmented, well-segmented, or under-segmented for various values of segment parameter k and then defining conditions when segmentation quality is desirable.

In an Example 1, embodiments of the invention include an illustrative method of segmenting an image. Embodiments of the illustrative method include determining a first value of a segment parameter, where the segment parameter relates to a threshold function for establishing a boundary condition between a first segment and a second segment; determining a first value of a similarity function configured to indicate a similarity between the image and its segmentation based on the first value of the segment parameter; comparing the first value of the segment parameter and the first value of the similarity function to a predetermined function; determining a second value of the segment parameter based on a result of the comparing; and segmenting the image based on the second value of the segment parameter. In embodiments, a bisection algorithm may be used to find the value of k, such that the point (k, numsegments(k)), where "numsegments (k)" represents the number of segments produced when using the value, k, lies within a predetermined region or on a predetermined curve. The similarity function may include a symmetric uncertainty function. In embodiments, the predetermined function may be a linear function representing a linear relationship between the log of the segment parameter and the symmetric uncertainty, where a value above the linear function indicates over-segmentation and a value below the linear function indicates under-segmentation. Additional, alternative, and/or overlapping embodiments may include other similarity functions between the image and segmentation map of the image.

In an Example 2, embodiments of the method of Example 1 further include determining an optimal value of the segment parameter, where the optimal value is a value of the segment parameter that generates a segmentation of the image for which a difference between a corresponding value of the symmetric uncertainty and a portion of the linear relationship is minimized.

In an Example 3, embodiments of the method of Example 1, segmenting the image based on the second value of the segment parameter may include dividing the image into a plurality of sub-images; generating a scale map for the image by determining a plurality of values of the segment parameter, wherein each of the plurality of values corresponds to one of the plurality of sub-images; and smoothing the scale map for the image using a filter. The filter may be a low-pass filter.

In an Example 4, embodiments of the method of Example 1 may further include providing an additional image, where the additional image is disposed subsequent to the image in a video; dividing the additional image into an additional plurality of sub-images, where the additional plurality of sub-images corresponds to the plurality of sub-images in at least one of size and location; providing the plurality of values of the segment parameter as a plurality of initial estimates for the segment parameter corresponding to the additional plurality of sub-images; determining a plurality of optimized values of the segment parameter, wherein each of the plurality of optimized values corresponds to one of the additional plurality of sub-images; and segmenting the additional image based on the plurality of optimized values of the segment parameter.

In an Example 5, embodiments of the method of Example 1, determining the linear function may include providing a plurality of training images; generating a segmentation map for each of the plurality of training images at a plurality of values of the segment parameter; determining a value of a symmetric uncertainty for each segmentation map; and classifying each segmentation map as being over-segmented, well segmented, or under-segmented, based on a visual perception by at least one observer.

In an Example 6, another illustrative method of segmenting an image may include providing an image; and dividing the image into a plurality of sub-images, each sub-image including a plurality of pixels. For each sub-image, embodiments of the illustrative method may include determining a first value of a parameter, where the parameter relates to a threshold function for establishing a boundary condition between a first segment and a second segment; determining a first value of a symmetric uncertainty of the sub-image based on the first value of the first parameter; comparing the first value of the parameter and the first value of the symmetric uncertainty to a predetermined function; and determining a second value of the parameter based on a result of the comparing.

In an Example 7, the illustrative method of Example 6 may further include assigning the determined value of the parameter to each pixel in the sub-image; applying a filter to the assigned values to obtain a filtered value of the parameter for each pixel in the sub-image; and segmenting the image based on the filtered values of the parameter. In embodiments, the filter includes a low-pass filter.

In an Example 8, the illustrative method of Example 7 may further include providing an additional image; dividing the additional image into an additional plurality of sub-images; segmenting the additional image based in part on the second value of the parameter determined for each of the first plurality of sub-images of the image. In embodiments, the predetermined function may be a linear function representing a linear relationship between the log of the first parameter and the symmetric uncertainty, where a value above the linear function indicates over-segmentation and a value below the linear function indicates under-segmentation.

In an Example 9, the method of Example 8 may further include providing a plurality of training images; generating a map for each of the plurality of training images at a plurality of values of the segment parameter; determining a value of a symmetric uncertainty for each segmentation map; and classifying each segmentation map as being over-segmented, well-segmented, or under-segmented, based on a visual perception by at least one observer.

In an Example 10, an illustrative system includes an image segmentation device having a processor and a memory. The memory include computer-readable media having computer-executable instructions embodied thereon that, when executed by the processor, cause the processor to instantiate one or more components. In embodiments, the one or more components include a segment module configured to determine a functional relationship between a first parameter and a second parameter based on an input electronically received about a plurality of training images. The segment module may be further configured to, for a sub-image of an image to be segmented, determine an initial value of the first parameter for the sub-image; and determine an initial value of the second parameter. The one or more components may further include a comparison module configured to perform a comparison between the initial value of the first parameter and the initial value of the second parameter to the functional relationship, where the segment module is further configured to determine an updated value of the first parameter based on the comparison.

In an Example 11, the system of Example 10, the segment module may be further configured to segment the image, based in part on the updated value of the first parameter, to create segmented image data.

In an Example 12, the system of Example 11 may further include an encoder configured to encode the segmented image data.

In an Example 13, the system of Example 12 may further include a communication module configured to facilitate communication of at least one of the image to be segmented and the segmented image data.

In an Example 14, the system of Example 12, the segment module may be further configured to divide the additional image into a plurality of sub-images; and segment the additional image, based in part on the updated value of the first parameter.

In an Example 15, the system of Example 10, the second parameter may include a symmetric uncertainty of the sub-image.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings.

Although the term "block" may be used herein to connote different elements of illustrative methods employed, the term should not be interpreted as implying any requirement of, or particular order among or between, various steps disclosed herein unless and except when explicitly referring to the order of individual steps.

Figure 2:
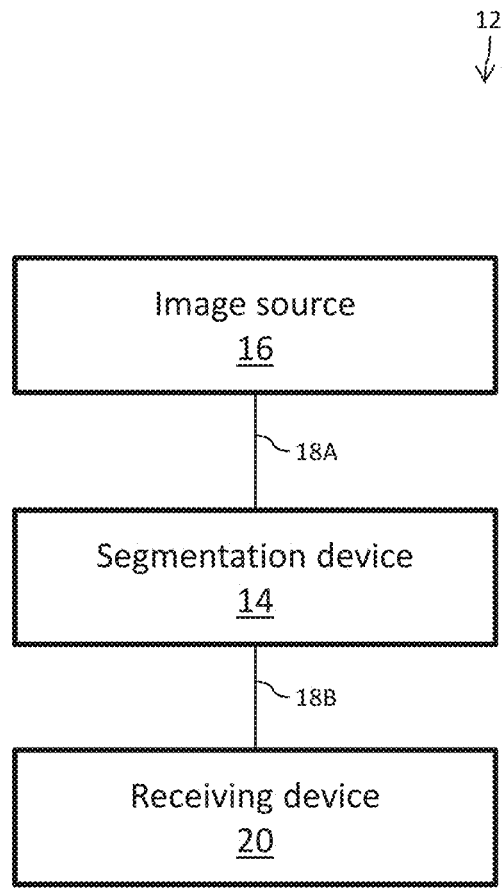
FIG. 2 illustrates an exemplary image segmentation system, in accordance with embodiments of the invention.

Referring to FIG. 2, an exemplary image segmentation system 12 is shown. Image segmentation system 12 includes a segmentation device 14. Segmentation device 14 is illustratively coupled to image source 16 by communication link 18A. In one exemplary embodiment, segmentation device 14 illustratively receives an image file from image source 16 over communication link 18A. Exemplary image files include, but are not limited to, digital photographs, digital image files from medical imaging, machine vision image files, video image files, and any other suitable images having a plurality of pixels. Segmentation device 14 is illustratively coupled to receiving device 20 by communication link 18B. In one exemplary embodiment, segmentation device 14 communicates an image file over communication link 18B. In some embodiments, communication links 18A, 18B are independently a wired connection, or a wireless connection, or a combination of wired and wireless networks. In some embodiments, one or both of communication links 18A, 18B are a network. Illustrative networks include any number of different types of communication networks such as, a short messaging service (SMS), a local area network (LAN), a wireless LAN (WLAN), a wide area network (WAN), the Internet, a P2P network, or other suitable networks. The network may include a combination of multiple networks.

Although not illustrated herein, the receiving device 20 may include any combination of components described herein with reference to segmentation device 14, components not shown or described, and/or combinations of these. In embodiments, the segmentation device 14 may include, or be similar to, the encoding computing systems described in U.S. application Ser. No. 13/428,707, filed Mar. 23, 2012, entitled "VIDEO ENCODING SYSTEM AND METHOD;" and/or U.S. application Ser. No. 13/868,749, filed Apr. 23, 2013, entitled "MACROBLOCK PARTITIONING AND MOTION ESTIMATION USING OBJECT ANALYSIS FOR VIDEO COMPRESSION;" the disclosure of each of which is expressly incorporated by reference herein.

Figure 3:
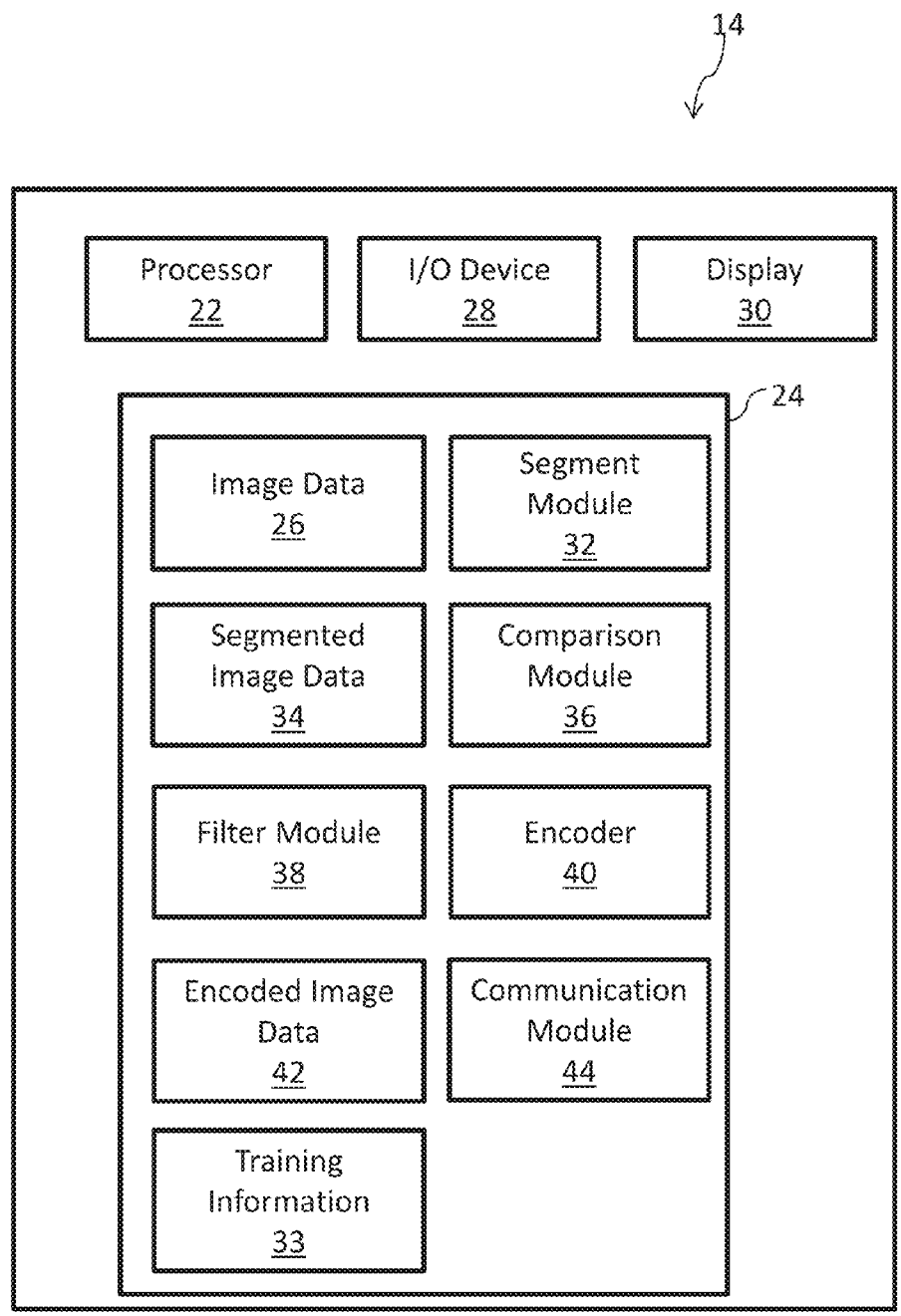
FIG. 3 illustrates an exemplary segmentation device of the image segmentation system shown in FIG. 2, in accordance with embodiments of the invention.

An exemplary segmentation device 14 is schematically illustrated in FIG. 3. Although referred to as a single device, in some embodiments, segmentation device 14 may be implemented in multiple instances, distributed across multiple computing devices, instantiated within multiple virtual machines, and/or the like. Segmentation device 14 includes a processor 22. Processor 22 may include one or multiple processors. Processor 22 executes various program components stored in memory 24, which may facilitate encoding the image data 26 of the received image file. As shown in FIG. 3, segmentation device 14 further includes at least one input/output device 28, such as, for example, a monitor or other suitable display 30, a keyboard, a printer, a disk drive, a universal serial bus (USB) port, a speaker, pointer device, a trackball, a button, a switch, a touch screen, and/or other suitable I/O devices.

Various components of image segmentation system 12 and/or segmentation device 14 may be implemented on one or more computing devices. A computing device may include any type of computing device suitable for implementing embodiments of the invention. Examples of computing devices include specialized computing devices or general-purpose computing devices such "workstations," "servers," "laptops," "desktops," "tablet computers," "hand-held devices," and the like, provided that the computing device has been configured as disclosed herein. For example, according to embodiments, the segmentation device 14 may be or include a specially-designed computing device (e.g., a dedicated video encoding device), and/or a general purpose computing device (e.g., a desktop computer, a laptop, a mobile device, and/or the like) configured to execute computer-executable instructions stored in a memory 24 for causing the processor 22 to implement aspects of embodiments of system components discussed herein and/or to perform aspects of embodiments of methods and procedures discussed herein.

In embodiments, a computing device includes a bus that, directly and/or indirectly, couples the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in embodiments, the computing device may include a number of processors, a number of memory components, a number of I/O ports, a number of I/O components, and/or a number of power supplies. Additionally any number of these components, or combinations thereof, may be distributed and/or duplicated across a number of computing devices.

In embodiments, the memory 24 includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; or any other medium that can be used to store information and can be accessed by a computing device such as, for example, quantum state memory, and the like. The memory 24 may be local to processor 22, and/or the memory 24 may be remote from processor 22 and accessible over a network. In embodiments, the memory 24 stores computer-executable instructions for causing the processor 22 to implement aspects of embodiments of system components discussed herein and/or to perform aspects of embodiments of methods and procedures discussed herein. Computer-executable instructions may include, for example, computer code, machine-useable instructions, and the like such as, for example, program components capable of being executed by one or more processors associated with a computing device. Examples of such program components include a segment module 32, a comparison module 36, and a filter module 38. Some or all of the functionality contemplated herein may also, or alternatively, be implemented in hardware and/or firmware.

In embodiments, one or more of the program components utilize training information 33 to assist in determining the appropriate segmentation of an image. For example, training information may include a plurality of images segmented at different values of k. The training images may be used to determine a value for k that corresponds to a well-segmented segmentation for the given image type (medical image, video image, landscape image, etc.). As explained in more detail herein, this value of k from the training images may be used to assist in determining appropriate segmentation of further images automatically by segmentation device 14. In one embodiment, training information 33 includes information on a variety of different image types. In embodiments, training information includes a segmentation quality model that was derived from a set of training images, their segmentations and the classification of these segmentations by a human observer. In embodiments, the training images and their segmentations are not retained.

In embodiments, the segment module 32 is configured to segment an image into a plurality of segments, as described in more detail below. The segments may be stored in memory 24 as segmented image data 34. Segment data includes a plurality of pixels of the image. Segment image data 34 may also comprise one or more parameters associated with image data 34, such as the scale maps illustrated in FIGS. 10B and 11B. The segments may include, for example, objects, groups, slices, tiles, and/or the like. The segment module 32 may employ any number of various automatic image segmentation methods known in the field. In embodiments, the segment module 32 may use image color of the pixels and corresponding gradients of the pixels to subdivide an image into segments that have similar color and texture. Two examples of image segmentation techniques include the watershed algorithm and optimum cut partitioning of a pixel connectivity graph. For example, the segment module 32 may use Canny edge detection to detect edges on a video frame for optimum cut partitioning, and create segments using the optimum cut partitioning of the resulting pixel connectivity graph.

Figure 5A:
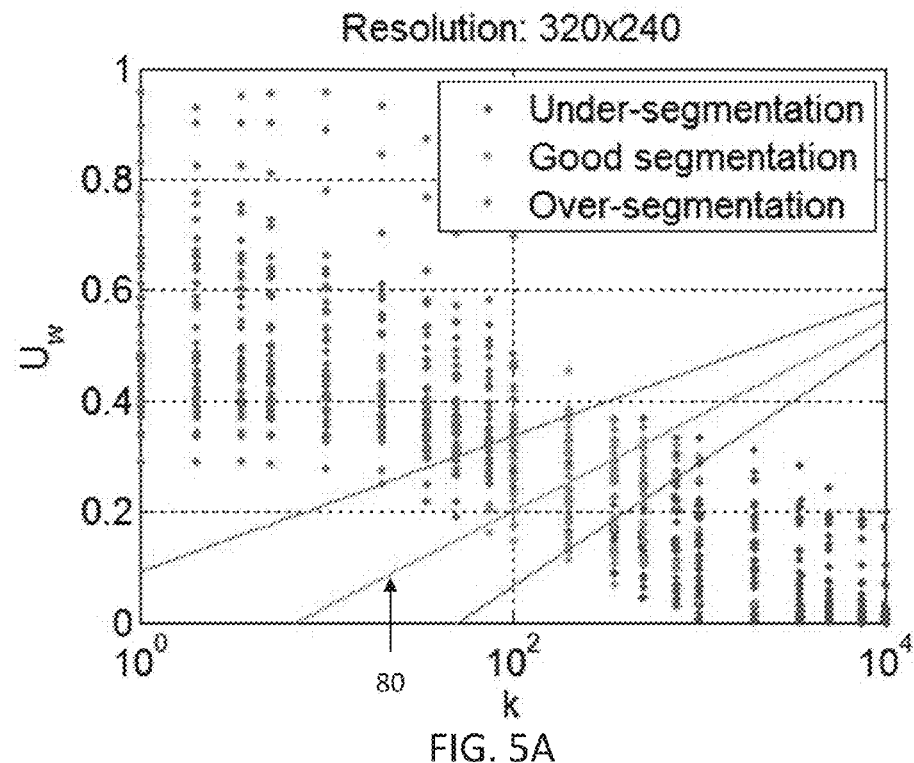
FIG. 5A illustrates the classification of training images performed by a human observer for image resolutions of 320×240 and an optimal segmentation line showing a desired segment number versus k.

In embodiments, the comparison module 36 may compare a calculated value or pair of values as described in more detail below. For example, the comparison module 36 may compare the parameter k in Equation (2) above, and/or $U_w$ in Equation (4) below, with a reference value or pair of values, such as is shown in FIG. 5A.

Figure 10A:
FIG. 10A is an image at 640×480 resolution.
Figure 10B:
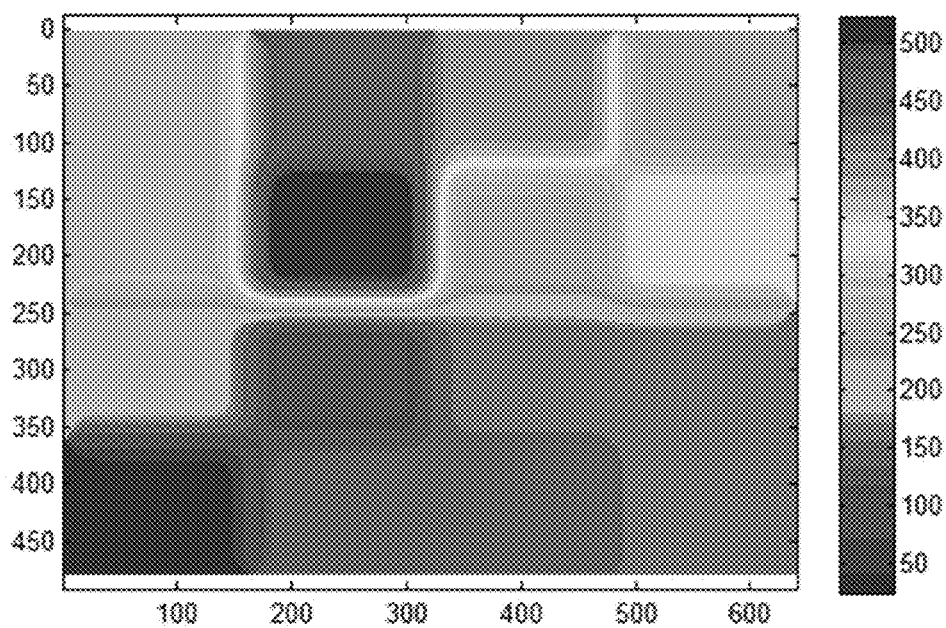
FIG. 10B is a scale map of k(x,y) of the image of FIG. 10A obtained using the method of FIG. 8, in accordance with embodiments of the invention.

In embodiments, the filter module 38 may apply a filter to image data 26 or segmented image data 34 as described in more detail below. For example, the filter module 38 may apply a low pass filter to a scale map of an image to avoid sharp transitions between adjacent sub-images, such as is shown in FIGS. 10B and 11B.

In the illustrative embodiment of FIG. 3, segmentation device 14 includes an encoder 40 configured for encoding image data 26 to produce encoded image data 42. In embodiments, image data 26 is both segmented and encoded. As illustrated in FIG. 3, segmentation device 14 further includes a communication module 44. In some embodiments, the communication module 44 may facilitate communication of image data 26 between image source 16 and segmentation device 14. In some embodiments, the communication module 44 may facilitate communication of segmented image data 34 and/or encoded image data 42 between segmentation device 14 and receiving device 20.

Figure 1A:
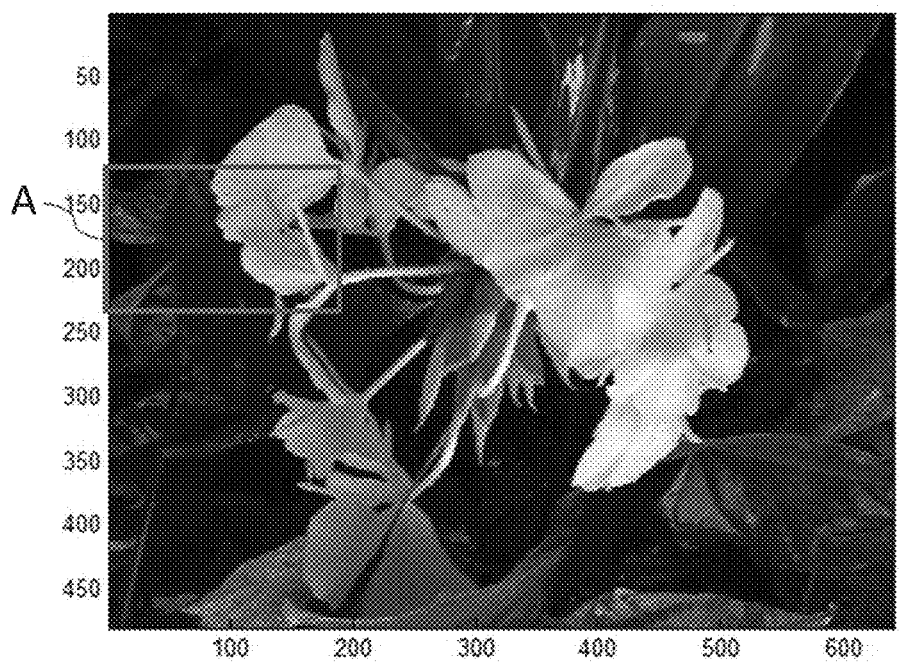
FIG. 1A is an exemplary 640×480 color image.
Figure 1B:
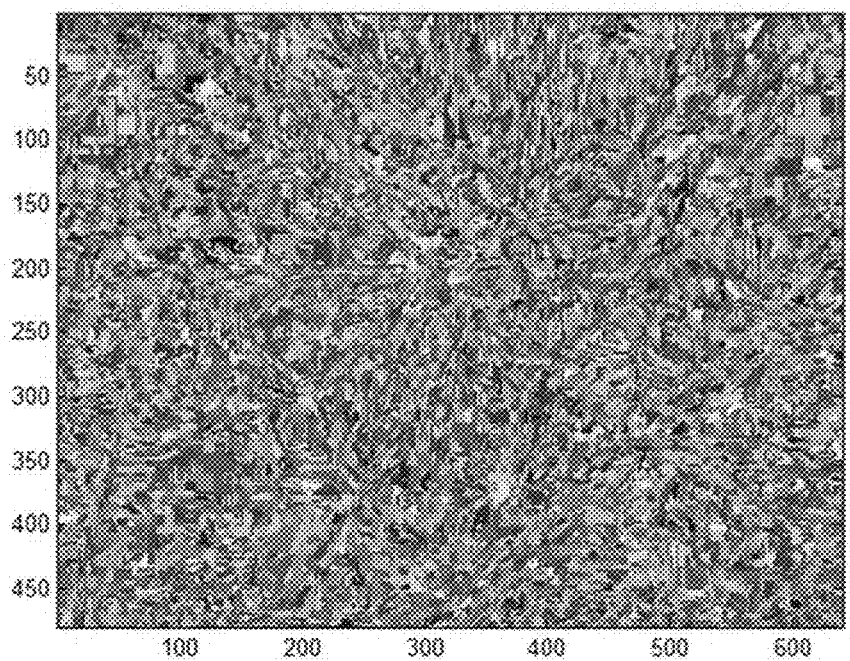
FIG. 1B is a segmentation map of the color image of FIG. 1A wherein k=3.
Figure 1C:
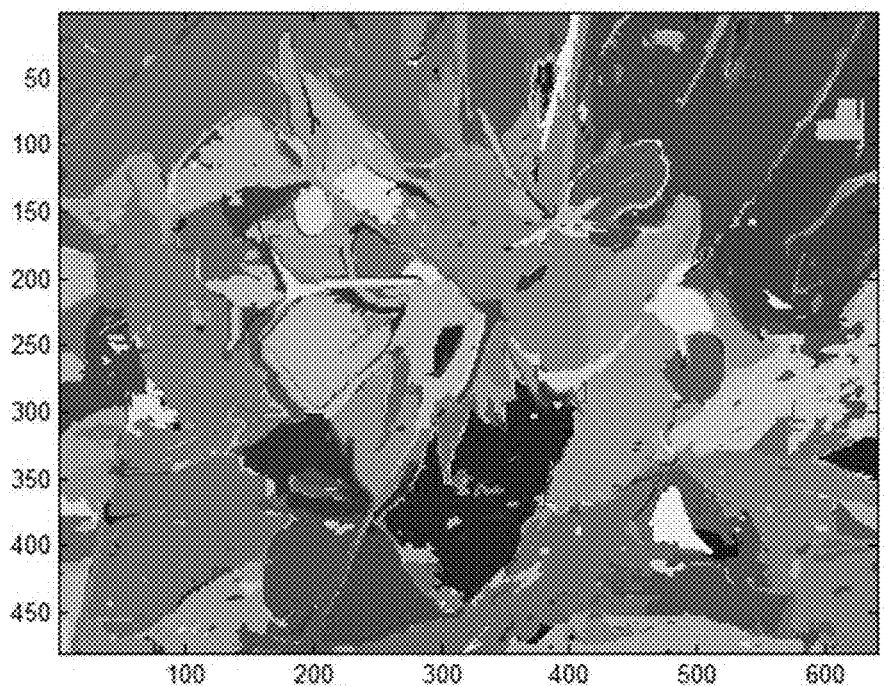
FIG. 1C is a segmentation map of the color image of FIG. 1A wherein k=100.
Figure 1D:
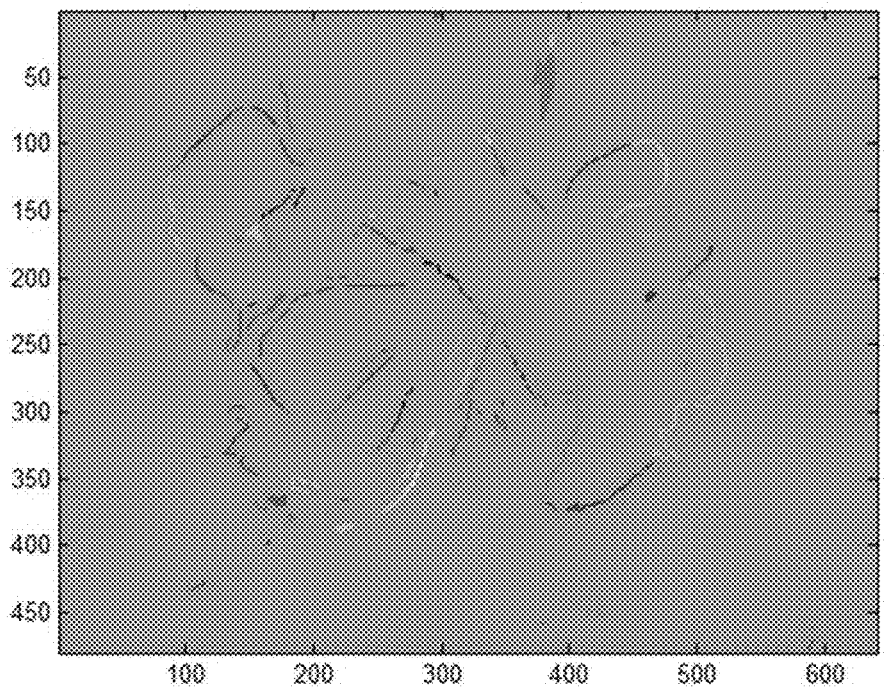
FIG. 1D is a segmentation map of the color image of FIG. 1A wherein k=10,000.
Figure 4A:
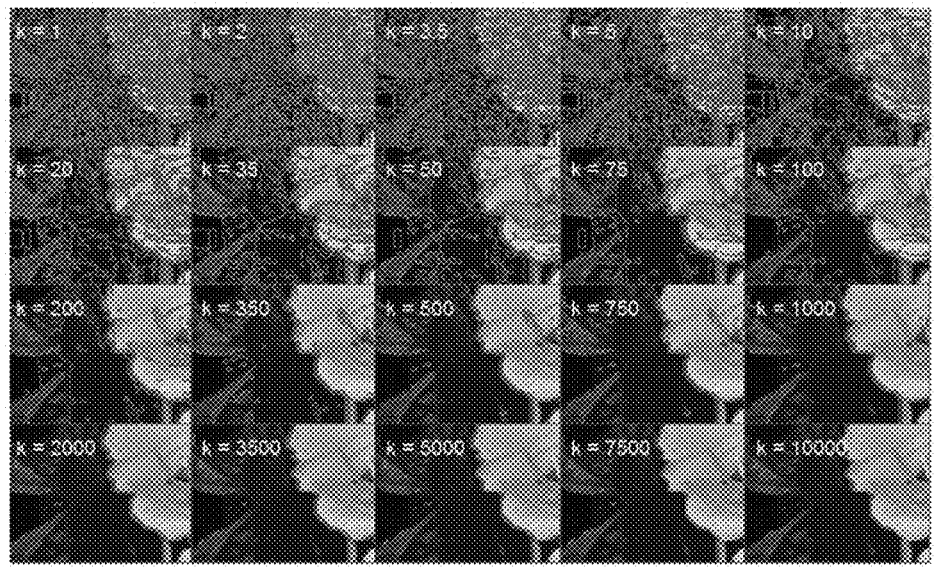
FIG. 4A is a series of segmentation maps for a block of 160×120 pixels labeled A in the color image of FIG. 1A, wherein k ranges from 1 to 10,000.
Figure 4B:
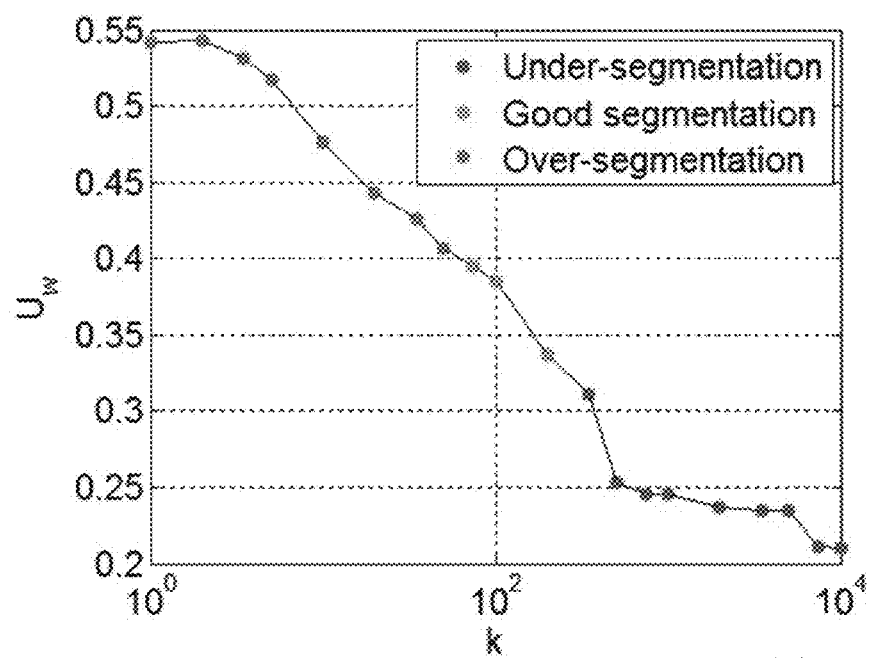
FIG. 4B illustrates the weighted uncertainty, $U_w$ of the segmentation maps of FIG. 4A as a function of k together with an evaluation performed by a human observer.

FIG. 4A illustrates portion A of FIG. 1A showing a block of 160×120 pixels segmented with the graph-based approach of Felzenszwalb and Huttenlocher for σ=0.5, min size=5, and values of k ranging from 1 to 10,000. For relatively low values of k from 1 to 50 (first eight images of twenty shown), over-segmentation generally occurs at visual inspection, thus meaning that areas that perceptually important regions are erroneously divided into sets of segments. For relatively high values of k ranging from 350 to 10,000 (last nine images of twenty shown), too few segments are present in the segmentation map, resulting from under-segmentation. For values of k from 75 to 200 (remaining three images of twenty shown), the segmentation appears generally good. These results are indicated in FIG. 4B.

A similarity function such as, for example, a quantitative index, can be defined to represent the amount of information contained in the original image, img, that is captured by the segmentation process. In embodiments, for example, a color image may be defined by substituting the RGB value in each pixel with the average RGB value of the pixels in the corresponding segment, seg. For each color channel, the symmetric uncertainty U between img and seg can be computed by Equation (3), as given by Witten & Frank in Witten, Ian H. & Frank, Eibe, Data Mining: Practical Machine Learning Tools and Techniques, Morgan Kaufmann, Amsterdam, ISBN 978-0-12-374856-0, the disclosures of which are hereby incorporated by reference in their entirety.

$$U_{\{R,G,B\}} = \frac{2I(img_{\{R,G,B\}}, seg_{\{R,G,B\}})}{S^{img}_{\{R,G,B\}} + S^{seg}_{\{R,G,B\}}} \quad (3)$$

where $S_i^j$ indicates the Shannon's entropy, in bits, of the i-th channel for the image j, and where I(i,j) is the mutual information, in bits, of the images i and j.

The symmetric uncertainty U expresses the percentage of bits that are shared between img and seg for each color channel. The value of U tends to zero when the segmentation map is uncorrelated with the original color image channel, whereas it is close to one when the segmentation map represent any fine detail in the corresponding channel of img.

Different images have different quantity of information in each color channel. For example, the color image of FIG. 1A contains a large amount of information in the green channel. A weighted uncertainty index, $U_w$ can be defined as in Equation (4) as:

$$U_w = \frac{U_R \cdot S_R + U_G \cdot S_G + U_B \cdot S_B}{S_R + S_G + S_B} \quad (4)$$

where U is determined for each channel as in Equation (3), and S is the Shannon's entropy for each channel.

The index $U_W$ is comprised between 0 and 1 and is correlated with the segmentation quality. Referring to FIG. 4B, the weighted uncertainty index $U_w$ is plotted as a function of log(k) for each of the 160×120 pixel blocks illustrated in FIG. 1A.

Segmentation Quality Model

For a typical image, $U_W$ will decrease as k increases, passing from over-segmentation to under-segmentation. For a particular segmentation quality model, a representative set of training images at representative resolutions may be selected. For example, the curve depicted in FIG. 4B shows how the number of segments varies with k for the segmentation of portion A of the image in FIG. 1A at a given resolution. Given multiple training images and human classification of their segmentation quality at different values of k as in FIGS. 5A and 5B, a quality model can be derived as was done with 80 in FIGS. 5A and 5B by determining a straight-line fit through the well-segmented points on the graphs. A single quality model can be used for multiple resolutions, or a quality model can be generated for each resolution. A set of twelve images, including flowers, portraits, landscapes and sport environments images, at 320×240 and 640×480 resolutions were next considered as training sets for the segmentation quality in one embodiment. According to embodiments, each image was divided into blocks of 160×120 pixels, and each block was segmented with the graph-based algorithm Felzenszwalb and Huttenlocher for σ=0.5, min size=5, and values of k ranging from 1 to 10,000. Each segmented block was displayed with display 30 and classified by a human observer through I/O devices 28 as over-segmented, well segmented or under-segmented. A weighted uncertainty index, $U_w$, was determined for each segmented block according to Equation (4).

Figure 5B:
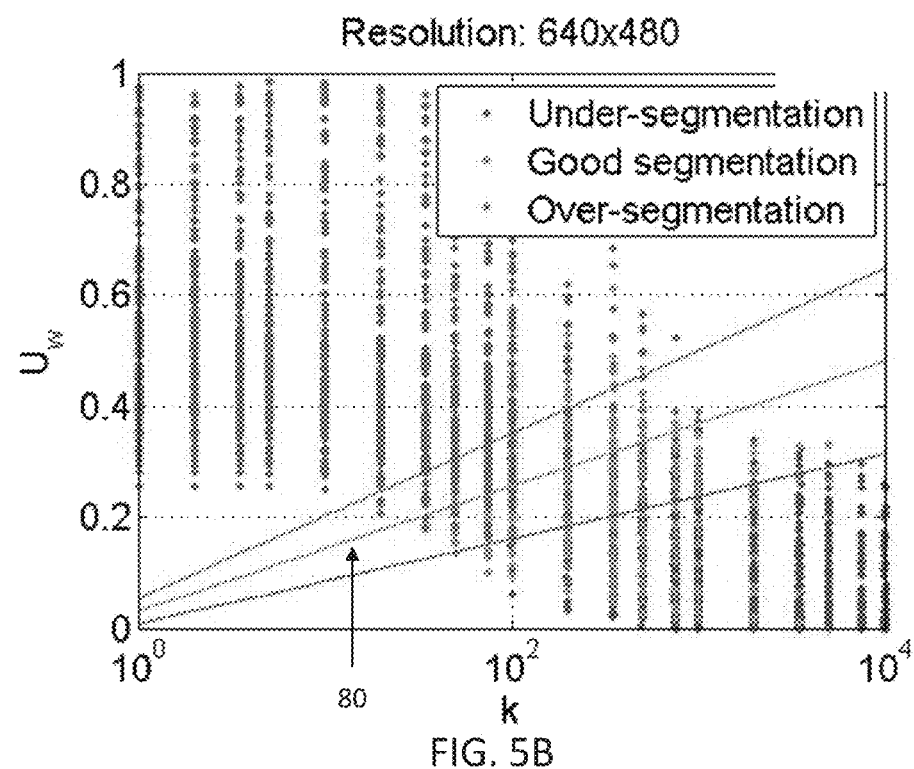
FIG. 5B illustrates the classification of training images performed by a human observer for image resolutions of 640×480 and an optimal segmentation line showing a desired segment number versus k.

The results are presented in FIGS. 5A and 5B. As illustrated in FIGS. 5A and 5B, a single value or range of k does not correspond to well-segmented blocks at a given resolution. However, an area in the (log(k), $U_w$) plane can be defined for this purpose.

For each block considered, an S-shaped curve $U_W = U_W$[log(k)] in the (log(k), $U_W$) space was observed. As shown in FIGS. 5A and 5B, for relatively small k values, $U_W$ remains almost constant, and a human observer generally classifies these data as over-segmented. As k increases, $U_W$ decreases rapidly and a human observer generally classifies this data as well segmented. For relatively high k values, a human observer generally classifies this data as under-segmented, and $U_w$ approaches another almost constant value.

Output of the segmentation algorithm was classified as under-segmented, well-segmented, or over-segmented by a human supervisor for each training image and each input value of k. In embodiments, the straight-line quality model was stored. In other embodiments, all of the training results may be stored and the quality model may be derived as needed. In embodiments, some form of classifier may be stored that allows the classification of the (k, numsegments (k)) ordered pair as over-segmented, under-segmented, or well-segmented. The (log(k), $U_W$) plane is subdivided into three different regions corresponding to 3 qualities of the segmentation result. Equation (5) was utilized to estimate the (m, b) parameters of the line $U_W$=m·log(k)+b that separates under-segmented and well-segmented regions.

$$E(m, b) = \sum_{i=1}^{N_{US}} \frac{|m \cdot \log(k_i) - U_{W,i} + b|}{\sqrt{m^2 + 1}} \cdot \delta_{US,i} + \sum_{i=1}^{N_{WE}} \frac{|m \cdot \log(k_i) - U_{W,i} + b|}{\sqrt{m^2 + 1}} \cdot \delta_{WE,i} \quad (5)$$

where $N_{US}$ and $N_{WE}$ are respectively the number of under-segmented and well segmented points; and where $\delta_{US,i}$ and $\delta_{WE,i}$ are 0 if the point is correctly classified (i.e., for instance any under-segmentation point should lie under the $U_W$=m·log(k)+b line) and 1 otherwise.

Equation (6) was utilized to estimate the (m, b) parameters of the line $U_W$=m·log(k)+b that divides over-segmented and well-segmented regions.

$$E(m, b) = \sum_{i=1}^{N_{WE}} \frac{|m \cdot \log(k_i) - U_{W,i} + b|}{\sqrt{m^2 + 1}} \cdot \delta_{WE,i} + \sum_{i=1}^{N_{OS}} \frac{|m \cdot \log(k_i) - U_{W,i} + b|}{\sqrt{m^2 + 1}} \cdot \delta_{OS,i} \quad (6)$$

where $N_{OS}$ and $N_{WE}$ are respectively the number of over-segmented and well segmented points; and where $\delta_{OS,i}$ and $\delta_{WE,i}$ are 0 if the point is correctly classified (i.e., for instance any well-segmentation point should lie under the $U_W$=m·log(k)+b line) and 1 otherwise.

The values of Equations (5) and (6) were minimized using a numerical algorithm. In embodiments, a simplex method is used. In practice, the cost function in each of Equation (5) and Equation (6) is the sum of the distances from the line $U_W$=m·log(k)+b of all the points that are misclassified. The estimate of the two lines that divide the (log(k), $U_W$) may be performed independently.

The average line between the line dividing the under-segmented and well-segmented and the line dividing the well-segmented and over-segmented was assumed to be the optimal line 80 for segmentation in the (log(k), $U_W$) plane. Given the S-like shape of the typical $U_W$=$U_W$[log(k)] curve in the (log(k), $U_W$) plane, a point of intersection between the optimal line for segmentation and the $U_W$=$U_W$[log(k)] curve can generally be identified. In embodiments, Identification of this point gives an optimal k value for a given 160×120 image.

Identification of the Optimal k

Figure 6:
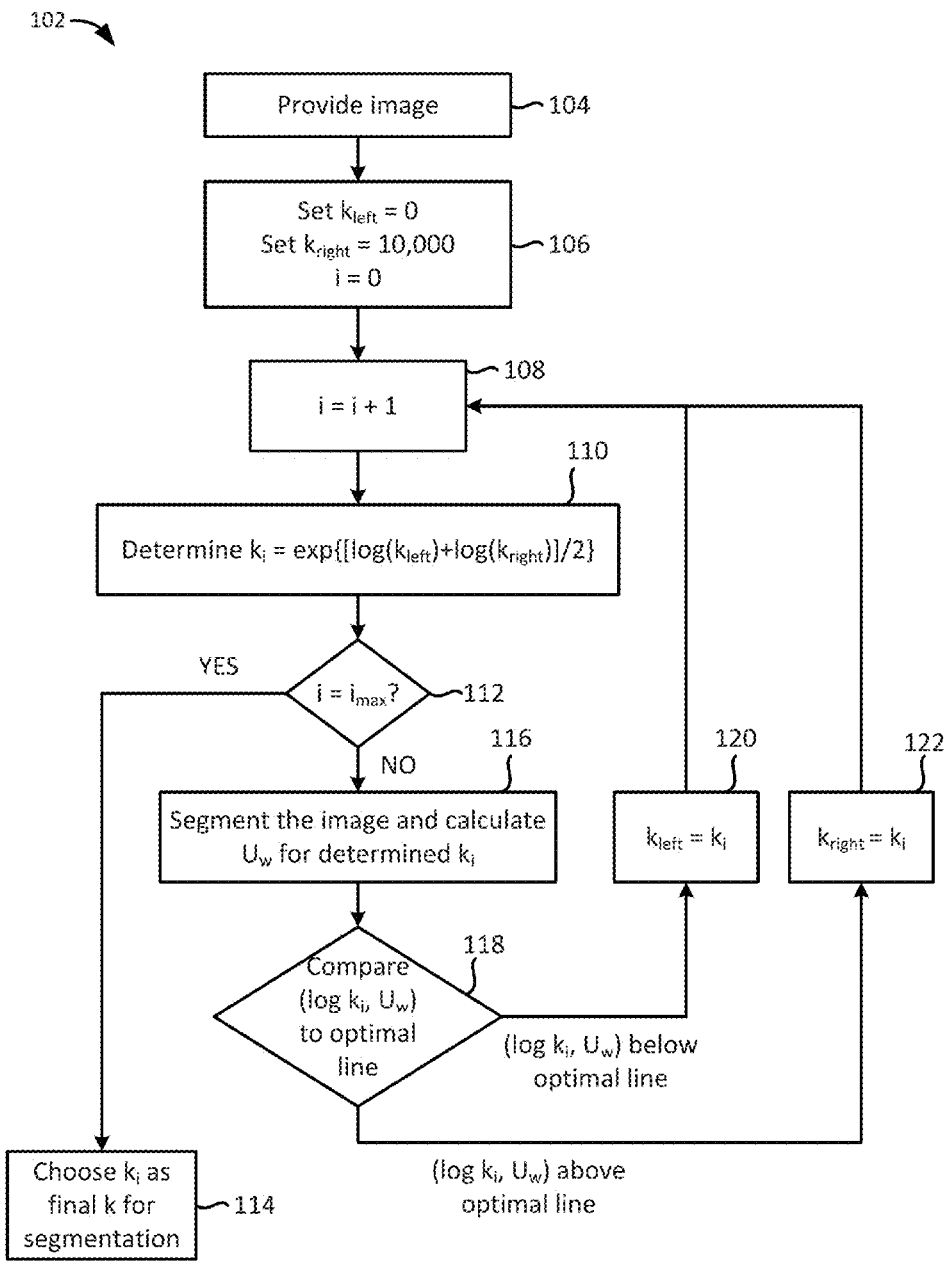
FIG. 6 illustrates an exemplary method for determining a value of k, in accordance with embodiments of the invention.

Referring next to FIG. 6, an exemplary method 102 of determining a k value is provided for an image. The optimal line for segmentation, m·log(k)+b, derived above constitutes a set of points in the (log(k), $U_W$) that may be reasonably perceived as good segmentation by a human observer. Consequently, given a sub-image of size 160×120 pixels, an optimal k value may be defined as a k value that generates a segmentation whose weighted symmetric uncertainty $U_W$ is close to m·log(k)+b. In other words, an optimal k value may include a k value for which a difference between the symmetric uncertainty, $U_W$, of the generated segmentation and a portion of a linear relationship such as, for example, m·log(k)+b, is minimized.

Figure 7A:
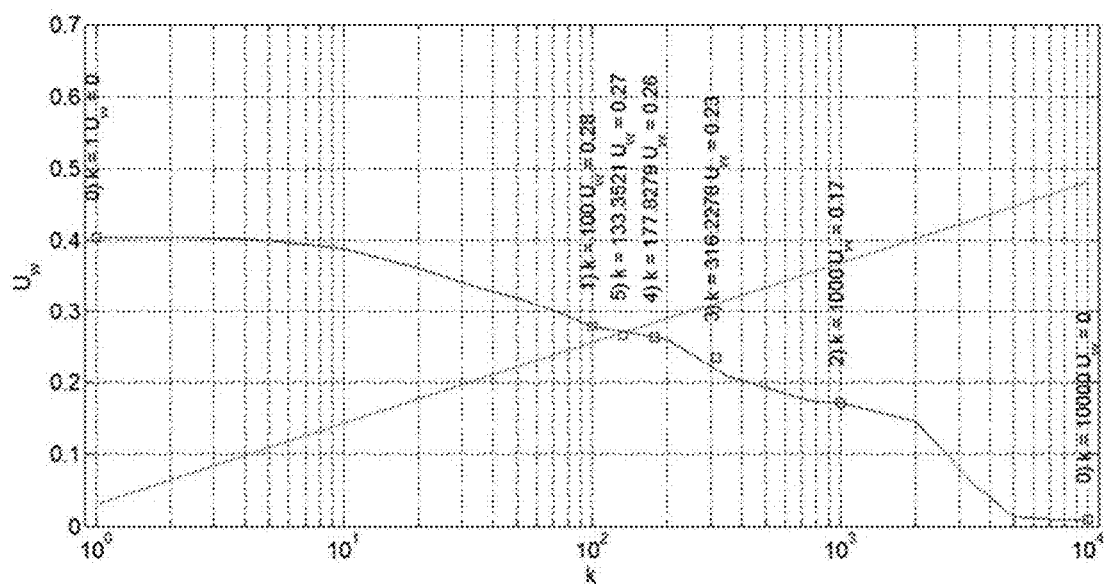
FIG. 7A illustrates the iterative method of estimating k of FIG. 6 for a 160×120 sub-image taken from a 640×480 image in the (log(k), $U_w$) plane, in accordance with embodiments of the invention.
Figure 7B:
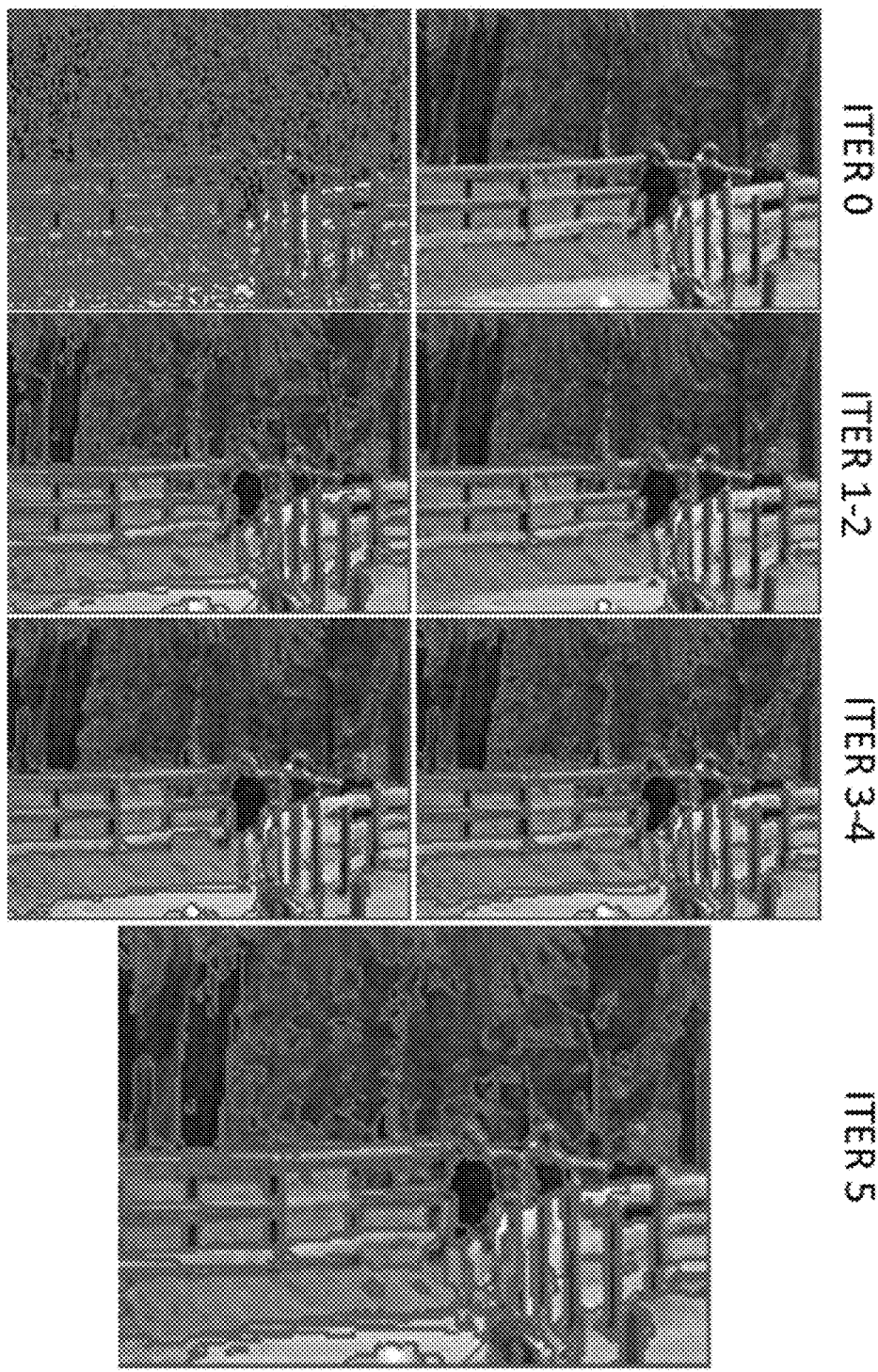
FIG. 7B illustrates the corresponding segmentation based on the estimates in FIG. 7A, in accordance with embodiments of the invention.

An optimal k value can be computed iteratively through a bisection method 102, as illustrated in FIGS. 7A and 7B. The results of an exemplary implementation of the first five iterations of embodiments of method 102 (FIG. 6) are provided in FIGS. 7A and 7B. In block 104, an image is provided, illustratively the image shown in FIG. 7B multiple times. The image is divided into a plurality of sub-images. The remainder of FIG. 6 is carried out for each sub-image of the image. As shown in block 106, at iteration i=0, the sub-image is segmented for $k_{Left}$=1 and $k_{Right}$=10,000. In embodiments, other values of k may be utilized. As illustrated in FIG. 7A, in this example, the corresponding values of $U_{W,Left}$ and $U_{W,Right}$ are computed for each of $k_{Left}$=1 and $k_{Right}$=10,000. FIG. 7B illustrates the segmentation of the exemplary image (all sub-images) at iteration i=0 for $k_{Left}$=1 (upper left of FIG. 7B, over-segmented) and $k_{Right}$=10,000 (upper right of FIG. 7B, under-segmented).

In block 108, the value of i is increased for the first iteration. In block 110, the mean log value (k=exp{[log ($k_{Left}$)+log($k_{Right}$)]/2} is used to determine a new k value.

In block 112, the current iteration i is compared to the maximum number of iterations. In some exemplary embodiments, the maximum number of iterations is a predetermined integer, such as 5 or any other integer, which may be selected, for example, to optimize a trade-off between computational burden and image segmentation quality. In other exemplary embodiments, the maximum number of iterations is based on a difference between the k and/or $U_w$ value determined in successive iterations. If the maximum number of iterations has been reached, the k value determined in block 110 is chosen as the final value of k for segmentation, as shown in block 114.

If the maximum number of iterations has not yet been reached in block 112, in block 116, the image is segmented and the corresponding $U_W$ is computed for the k value determined in block 110. As shown in FIG. 7A, the first iteration of k was 100, and the $U_w$ calculated in the first iteration was 0.28. An example of a resulting segmentation of a first iteration of k is shown in FIG. 7B (second row, left image).

In block 118, the determined $k_j$ and $U_w$ values are compared to the optimal line in the (log $k_i$, $U_w$) plane. For example, as shown in FIG. 7A, for the first iteration, (log $k_i$, $U_w$) is located above the optimal line. The value of $k_{right}$ is replaced with $k_i$ in block 122, and the method 102 returns to block 108. In contrast, for the second iteration, the value of k=1000 (second row, right image in FIG. 7B), $U_w$=0.17 is below the optimal line in the (log $k_i$, $U_w$) plane. In the second iteration, the value of $k_{left}$ is replaced with $k_i$ in block 120, and the method 102 returns to block 108.

Exemplary results of embodiments of method 102 are presented in FIG. 7A for the image of FIG. 7B. Although the initial k values of 0 and 10,000 resulted in strong over-segmentation and under-segmentation, respectively, after several iterations, the image of FIG. 7B appears well-segmented, and the corresponding point in the (log(k), $U_W$) space lies close to the optimal segmentation line, as shown in FIG. 7A. At iteration i=5, the k of 133.3521 and $U_w$ of 0.27 lies very close to the optimal segmentation line (FIG. 7A), and the image appears well-segmented (FIG. 7B, bottom image).

Although sub-images of 160×120 pixels were considered in FIGS. 7A and 7B, the parameters of the segmentation quality model change with the image resolution. In addition, the optimal segmentation line shown in FIG. 7A for a 320×240 resolution is lower than the optimal segmentation line shown in FIG. 7B for a 640×480 resolution. In embodiments, it is believed that at a higher resolution, more details may be generally visible in the image, thus indicating a higher segmentation quality (i.e. higher $U_w$). In embodiments, the application of the segmentation quality model to other image resolutions may indicate therefore to re-classify segmented sub-images of 160×120 pixels for the given resolution. In some embodiments, interpolation or extrapolation of known image or sub-image resolutions are used.

Adaptive Selection of k

Method 102 (FIG. 6) was used to estimate the optimal k value for a sub-image of 160×120 pixels as illustrated in FIGS. 7A and 7B. In embodiments, to segment a full image at resolution of 320×240 or 640×480 pixels, a set of adjacent sub-images may be considered. In some embodiments, putting together the independent segmentations of each sub-image may not produce a satisfying segmentation map, since segments across the borders of the sub-images may be divided into multiple segments.

Figure 8:
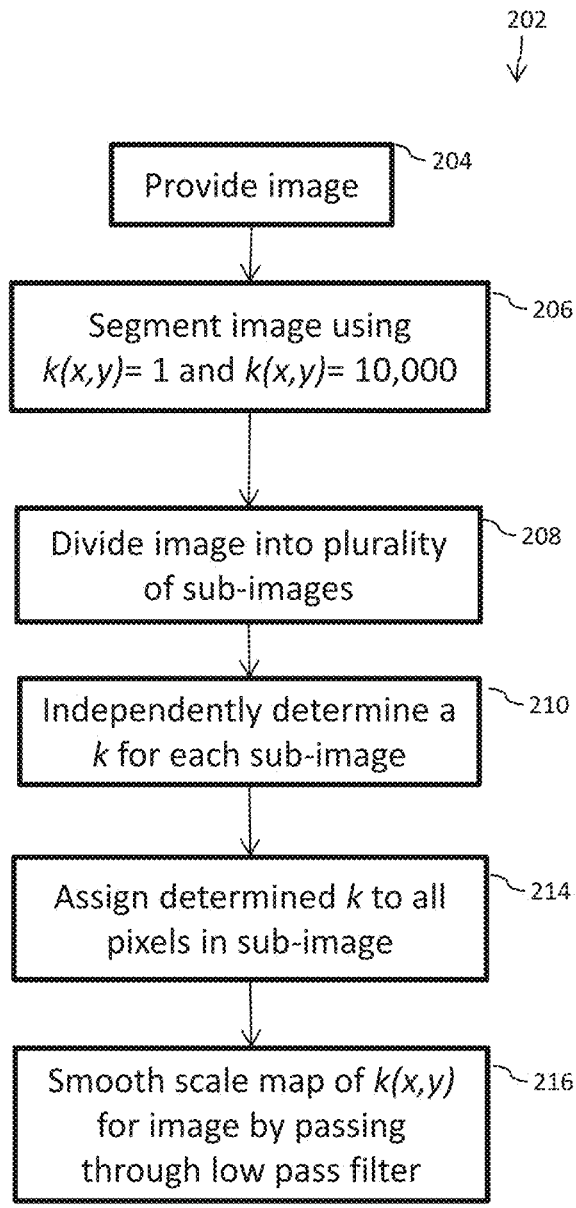
FIG. 8 illustrates another exemplary method for determining a value of k, in accordance with embodiments of the invention.
Figure 9A:
FIG. 9A is an image at 640×480 resolution.

Referring next to FIG. 8, a modified method 202 is presented. Method 202 makes use of an adaptive scale factor $k(x,y)$, and the threshold function $\tau(C)=k/|C|$ in Equation (2) becomes $\tau(C,x,y)=k(x,y)/|C|$. In step 204, an image is provided. Exemplary images are shown in FIG. 9A and FIG. 10A. For each image, as shown in block 206, the image is segmented using $k(x,y)=1$ and $k(x,y)=10,000$ for all the image pixels.

As shown in block 208, each image is then divided into a plurality of sub-images. Illustratively, each sub-image may be 160×120 pixels. In block 210, for each sub-image, and independently from the other sub-images, a value of k for each sub-image was determined. In some embodiments, the value of k is determined for the sub-image using method 102 as described above with respect to FIG. 6. In block 214, the value of k determined in block 212 is assigned to all pixels in the sub-image.

In block 216, a scale map of $k(x,y)$ for the image is smoothed through a low pass filter to avoid sharp transition of $k(x,y)$ along the image.

The results of an exemplary method 202 are illustrated in FIGS. 9 and 10. FIGS. 9A and 10A are two exemplary 640×480 pixel images taken from the dataset used for estimating the segmentation quality model in FIG. 5B. The $k(x,y)$ scale map for each image following the smoothing through the low pass filter in block 216 is presented in FIGS. 9B and 10B, and the corresponding segmentation is shown in FIGS. 9C and 10C.

Figure 9B:
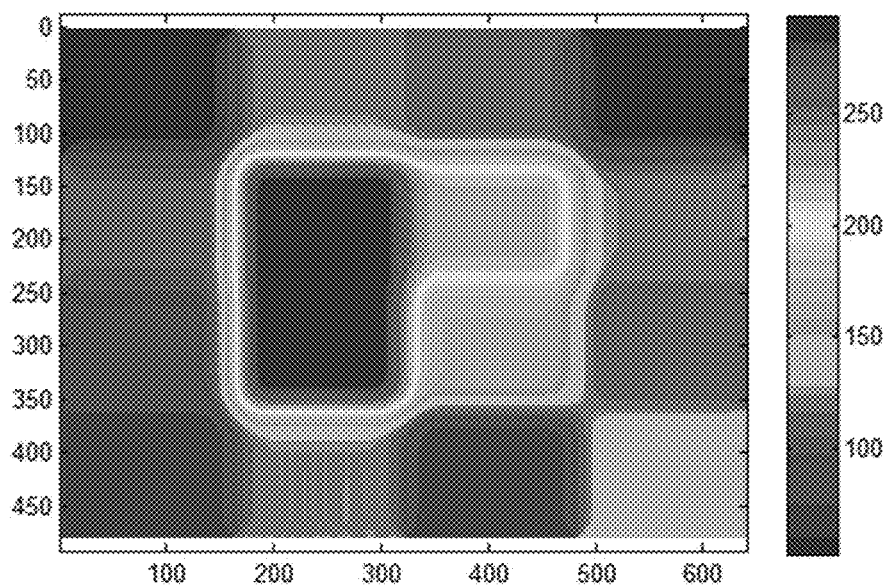
FIG. 9B is a scale map of k(x,y) of the image of FIG. 9A obtained using the method of FIG. 8, in accordance with embodiments of the invention.
Figure 9C:
FIG. 9C illustrates the corresponding segmentation of FIG. 9A using the method of FIG. 8, in accordance with embodiments of the invention.
Figure 9D:
FIG. 9D illustrates the corresponding segmentation of FIG. 9A using the method of Felzenszwalb and Huttenlocher, in which the scale parameter was chosen to obtain the same number of total segments as in the segmentation depicted in FIG. 9C.
Figure 10C:
FIG. 10C illustrates the corresponding segmentation of FIG. 10A using the method of FIG. 8, in accordance with embodiments of the invention.
Figure 10D:
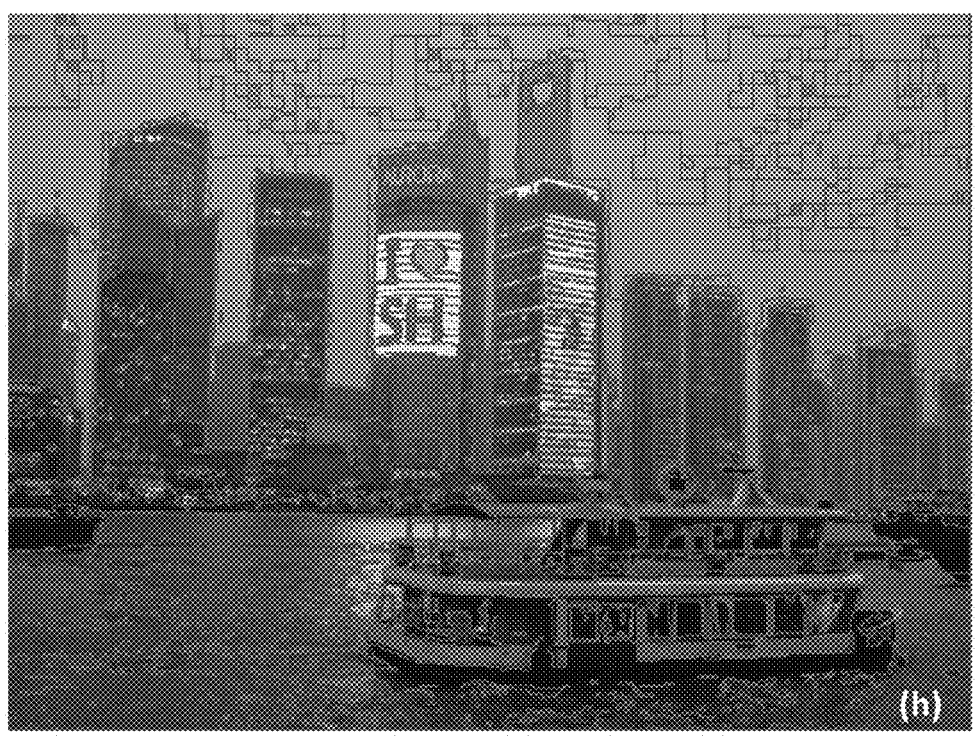
FIG. 10D illustrates the corresponding segmentation of FIG. 10A using the method of Felzenszwalb and Huttenlocher, in which the same number of total segments were obtained as in the segmentation depicted in FIG. 10C.

FIGS. 9D and 10D illustrate segmentation achieved with the graph-based approach of Felzenszwalb and Huttenlocher for σ=0.5, min size=5. The value of k was set experimentally to guarantee an equivalent number of segments as in FIGS. 9C and 9C. For FIG. 9D, k was set to 115, and for FIG. 10D, k was set to 187.

FIGS. 9B and 9C illustrate that the present method favors large segments (high k value) in the area occupied by persons in the image, and finer segmentation (low k value) in the upper left area of the image, where a large number of small leaves are present, when compared to the method of Felzenszwalb and Huttenlocher in FIG. 9D.

FIGS. 10B and 10C illustrate that embodiments of the present method may favor larger segments in the homogeneous area of the sky and skyscrapers, for example, preventing over-segmentation in the sky area, when compared to the method of Felzenszwalb and Huttenlocher as shown in FIG. 10D. In other embodiments, overlapping rectangular regions may be used.

Estimation of k for Subsequent Images

In some embodiments, the segmentation of a second image can be estimated based on the segmentation of a first image. Exemplary embodiments include video processing or video encoding, in which adjacent frames of images may be highly similar or highly correlated. A method 302 for segmenting a second image is provided in FIG. 11. In block 304, the first image is provided. The first image is segmented by dividing the first image into a plurality of sub-images in block 306, determining a value of k for each sub-image in block 308, and segmenting the image based on the determined k value in block 310. In some embodiments, segmenting the first image in blocks 306-310 is performed using method 102 (FIG. 6) or method 202 (FIG. 8). In block 312, a second image is provided. In some embodiments, the first and second images are subsequent video images. The second image is divided into a plurality of sub-images in block 314. In some embodiments, one or more of the plurality of sub-images of the second image in block 314 correspond in size and/or location to one or more of the plurality of sub-images of the first image in block 306. In block 316, the k value for each sub-image of the first image determined in block 308 is provided as an initial estimate for the k value of each corresponding sub-image of the second image.

Figure 11:
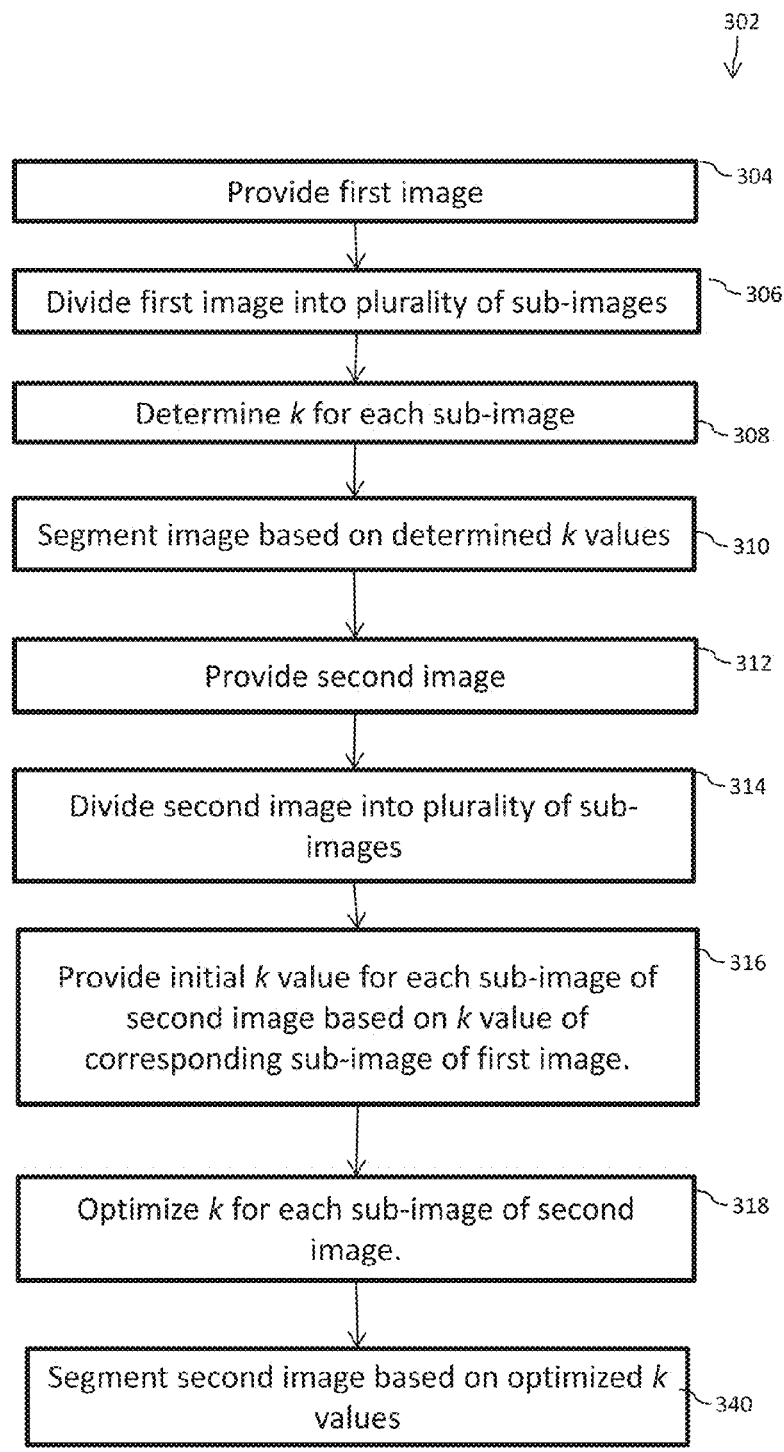
FIG. 11 illustrates a method of segmenting a second image based on the segmentation of a first image, in accordance with embodiments of the invention.

In other embodiments, as shown in FIG. 11, in block 318 the k values for the second image are optimized, using the estimated k values from the first image as an initial iteration, followed by segmenting the second image in block 340. In other embodiments, the second image is segmented based on the estimated k value in block 340 without first being optimized in block 318. In some embodiments, segmenting the second image in blocks 316-340 is performed using method 102 (FIG. 6) or method 202 (FIG. 8).

In some embodiments, such as in applications like video-encoding, it can also be noticed that the computational cost of segmenting the video images can be significantly reduced. When applied to a unique frame, the proposed method performs a research of the optimal k value for each sub-image considering the entire range for k. For a video-encoding application, since adjacent frames are highly correlated in videos, the range for k can be significantly reduced by considering the estimates obtained at previous frames for the same sub-image and/or corresponding sub-image. In embodiments, k values may be updated only at certain frame intervals and/or scene changes.

Additional Segmentation Methods

In some embodiments, the above methods of automatically optimizing a segmentation algorithm are performed based on edge thresholding and working in the YUV color space, achieving similar results. In embodiments in which multiple input parameters are used by the segmentation algorithm, a similar segmentation quality model is used, but the optimal segmentation line as show in FIGS. 5A, 5B, and 7A is replaced with transformed into a plane or hyper-plane.

While this invention has been described as relative to exemplary designs, the present invention may be further modified within the spirit and scope of this disclosure. Further, this application is intended to cover such departures from the present disclosure as come within known or customary practice in the art to which this invention pertains.

The invention claimed is:

1. A method of segmenting an image using a graph-based approach to image segmentation, comprising:
  providing an image;
  determining a first value of a segment parameter, wherein the segment parameter relates to a threshold function for establishing a boundary condition between a first segment and a second segment, wherein the segment parameter relates to a scale of observation in the graph-based approach to image segmentation;
  determining a first value of a similarity function configured to indicate a similarity between the image and its segmentation based on the first value of the segment parameter, wherein the similarity function comprises a symmetric uncertainty function;
  comparing the first value of the segment parameter and the first value of the similarity function to a predetermined function, wherein the predetermined function is a linear function representing a linear relationship between the log of the segment parameter and the symmetric uncertainty, wherein a value above the linear function indicates over-segmentation and a value below the linear function indicates under-segmentation;
  determining a second value of the segment parameter based on a result of the comparing;
  determining an optimal value of the segment parameter, the optimal value of the segment parameter comprising a value of the segment parameter that generates a segmentation of the image for which a difference between a corresponding value of the symmetric uncertainty and a portion of the linear relationship is minimized; and
  segmenting the image based on the optimal value of the segment parameter.

2. The method of claim 1, wherein segmenting the image based on the optimal value of the segment parameter comprises:
  dividing the image into a plurality of sub-images, wherein the sub-images are overlapping or non-overlapping;
  generating a scale map for the image by determining a plurality of values of the segment parameter, wherein each of the plurality of values corresponds to one of the plurality of sub-images; and
  smoothing the scale map for the image using a filter.

3. The method of claim 2, wherein the filter comprises a low-pass filter.

4. The method of claim 2, further comprising:
  providing an additional image, wherein the additional image is disposed subsequent to the image in a video;
  dividing the additional image into an additional plurality of sub-images, wherein the additional plurality of sub-images corresponds to the plurality of sub-images in at least one of size and location;
  providing the plurality of values of the segment parameter as a plurality of initial estimates for the segment parameter corresponding to the additional plurality of sub-images;
  determining a plurality of optimized values of the segment parameter, wherein each of the plurality of optimized values corresponds to one of the additional plurality of sub-images; and
  segmenting the additional image based on the plurality of optimized values of the segment parameter.

5. The method of claim 1, wherein determining the linear function includes:
  providing a plurality of training images;
  generating a segmentation map for each of the plurality of training images at a plurality of values of the segment parameter;
  determining a value of a symmetric uncertainty for each segmentation map; and
  classifying each segmentation map as being over-segmented, well segmented, or under-segmented, based on a visual perception by at least one observer.

* * * * *